United States Patent
de Echaniz et al.

(10) Patent No.: US 9,942,432 B2
(45) Date of Patent: Apr. 10, 2018

(54) ELECTROCHROMIC SCANNING BACKING MATERIAL

(71) Applicant: Xerox Corporation, Norwalk, CT (US)

(72) Inventors: Sebastián Rodrigo de Echaniz, Milton Keynes (GB); Michael John Wilsher, Letchworth (GB); Paul Simon Golding, Hertford (GB); Benjamin Thomas Thurnell, Stevenage (GB)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/240,777

(22) Filed: Aug. 18, 2016

(65) Prior Publication Data
US 2018/0054538 A1 Feb. 22, 2018

(51) Int. Cl.
| H04N 1/00 | (2006.01) |
| G02F 1/1334 | (2006.01) |
| H04N 1/10 | (2006.01) |
| G02F 1/163 | (2006.01) |

(52) U.S. Cl.
CPC ....... *H04N 1/00912* (2013.01); *G02F 1/1334* (2013.01); *G02F 1/163* (2013.01); *H04N 1/0032* (2013.01); *H04N 1/1061* (2013.01); *G02F 2201/44* (2013.01); *H04N 2201/0094* (2013.01); *H04N 2201/0422* (2013.01); *H04N 2201/0458* (2013.01)

(58) Field of Classification Search
None
See application file for complete search history.

(56) References Cited

U.S. PATENT DOCUMENTS

| 4,435,047 A | | 3/1984 | Fergason et al. |
| 5,171,413 A | | 12/1992 | Arntz et al. |
| 5,691,795 A | | 10/1997 | Doane et al. |
| 5,790,211 A | * | 8/1998 | Seachman .......... H04N 1/00795 349/113 |
| 5,928,572 A | | 7/1999 | Tonar et al. |
| 5,963,282 A | * | 10/1999 | Battersby .......... G02F 1/133509 349/116 |
| 6,061,107 A | | 5/2000 | Yang et al. |

(Continued)

OTHER PUBLICATIONS

U.S. Appl. No. 15/142,764, filed Apr. 29, 2016, de Echaniz, et al.

(Continued)

*Primary Examiner* — Miya J Williams
(74) *Attorney, Agent, or Firm* — Fay Sharpe LLP

(57) ABSTRACT

A scanning device includes a transparent platen which receives a sheet to be scanned. A backing assembly is spaced from the platen by the sheet during scanning. The backing assembly includes a backing plate of a fixed color and an electrochromic layer intermediate the backing plate and the platen. The electrochromic layer has a first state in which the electrochromic layer is opaque and has a different color from the fixed color, and a second state, in which the electrochromic layer is transparent to expose the backing plate through it. A sensor is positioned to acquire an image of the sheet based on light passing through the platen. A controller selectively applies a voltage across the electrochromic layer to change the electrochromic layer between the first and second states.

16 Claims, 7 Drawing Sheets

(56) References Cited

U.S. PATENT DOCUMENTS

| | | | | |
|---|---|---|---|---|
| 6,219,158 B1 * | 4/2001 | Dawe | ................ | H04N 1/00795 |
| | | | | 355/75 |
| 6,377,339 B1 * | 4/2002 | Westerman | ....... | G02F 1/134327 |
| | | | | 349/110 |
| 7,042,598 B2 * | 5/2006 | Payne | ................ | H04N 1/00702 |
| | | | | 271/186 |
| 7,058,350 B2 * | 6/2006 | Hsieh | ................ | H04N 1/00551 |
| | | | | 358/462 |
| 7,715,082 B2 | 5/2010 | Wang et al. | | |
| 8,259,319 B2 * | 9/2012 | Furukawa | ............. | G06F 1/3209 |
| | | | | 358/1.13 |
| 8,730,552 B2 | 4/2014 | Burdis et al. | | |
| 8,824,038 B2 | 8/2014 | Giron et al. | | |
| 2011/0122554 A1 * | 5/2011 | Ramrattan | ............. | G03B 17/00 |
| | | | | 361/679.01 |
| 2016/0202191 A1 | 7/2016 | Thoele et al. | | |

OTHER PUBLICATIONS

Doane, et al., "Field controlled light scattering from nematic microdroplets," Appl. Phys. Lett., vol. 48, 269 (1986)(Abstract only).

Doane, et al, "Polymer Dispersed Liquid Crystals for Display Applications," Mol. Cryst. Liq. Cryst. 165, 511 (1988) (Abstract only).

West, "Phase Separation of Liquid Crystals in Polymers," Mol. Cryst. Liq. Cryst. 157, 427 (1988).

Nagata, et al., "Silicon Chip Based Reflective PDLC Light Valve for Projection Display", SID Symposium Digest 29, 37 (1998) (Abstract only).

* cited by examiner

ELECTROCHROMIC SCANNING BACKING MATERIAL

BACKGROUND

The exemplary embodiment relates to document scanners, such as are used in printers, copiers, and/or multifunction devices and, more particularly, to a scanner with an electrochromic backing material which is selectively changeable between an opaque state and a transparent state, in which a backing plate is visible through the backing material.

Generally, a document scanner converts images and/or text on a hardcopy of a document into electronic form. The document scanning process may include placing the document on a top surface of a transparent platen (e.g., a flat glass plate). A scanner carriage is then moved past the document along the bottom surface of the platen. The scanner carriage includes a light source that illuminates the document and, particularly, the images and/or text thereon. The carriage or optical path also includes an image sensor, which incorporates photosensitive devices (e.g., photodiodes or other photosensitive devices) that measure the intensity of light reflected from given areas of the document. The sensor data is then translated from analog to digital, thereby defining the picture elements (i.e., pixels) of the document being scanned. Combined, these pixels represent the document in electronic form.

Another document scanning process involves a constant velocity transport (CVT) scanning system in which the document moves and the scanner carriage is stationary. In the CVT scanning system, a single stationary scanning system is utilized to scan the entire document while the document is moved past the scanning system. The CVT scanning system, conventionally, includes an image sensor, such as Contact Image Sensors (CIS) and CCD array systems, and a light source. As in the platen scanning system, the image sensor receives light reflected from the document and converts the light into electrical signals representing the intensity of the received light. The electrical signals are then passed on to an electronic subsystem which performs the necessary image processing operation so as to prepare the image data either for display on a display devices such as a CRT/LCD, for storage by a storage device such as a CD-ROM/Flash/Hard Drive etc., or for recording or printing on a medium, such as a document, in a similar manner as described above.

A backing material holds the document in close proximity to the platen. The scanner backing material may be white or black or a shade of grey. Lighter shades reflect more light, making images lighter, but also increasing the chances of show-through (image bleed through from the back side of the document). Darker shades reduce the chances of show-through, but produce darker images and can suffer from an Integrating Cavity Effect (ICE) around the edges of the document. There is no color or shade which is universally suitable for all originals, so a compromise is generally made between the two extremes.

INCORPORATION BY REFERENCE

The following references, the disclosures of which are incorporated herein by reference in their entireties, are mentioned:

U.S. Pat. No. 6,377,339, issued Apr. 23, 2002, entitled DOCUMENT IMAGING SYSTEM INCORPORATING A SELECTIVELY OPAQUE/TRANSPARENT LIQUID CRYSTAL PLATEN, by Westerman, et al.

U.S. application Ser. No. 15/142,764, filed 29 Apr. 2016, entitled LIQUID CRYSTAL CVT GLASS, by Sebastian Rodrigo de Echaniz, et al.

BRIEF DESCRIPTION

In accordance with one aspect of the exemplary embodiment, a scanning device includes a transparent platen which receives a sheet to be scanned. A backing assembly is spaced from the platen by the sheet during scanning. The backing assembly includes a backing plate of a fixed color and an electrochromic layer between the backing plate and the platen. The electrochromic layer has a first state in which the electrochromic layer is opaque and has a different color from the fixed color, and a second state, in which the electrochromic layer is transparent to expose the backing plate therethrough. A sensor is positioned to acquire an image of the sheet based on light passing through the platen. A controller selectively applies a voltage across the electrochromic layer to change the electrochromic layer between the first and second states.

In accordance with another aspect of the exemplary embodiment, a scanning method includes receiving a sheet to be scanned on a transparent platen and providing a backing assembly which is spaced from the platen by the sheet during scanning. The backing assembly includes a backing plate of a first color and an electrochromic layer between the backing plate and the platen which has a first state, in which the electrochromic layer is opaque and has a second color, and a second state, in which the electrochromic layer is transparent to expose the backing plate therethrough. A voltage is selectively applied across the electrochromic layer to change the electrochromic layer between the first and second states. An image of the sheet based on light passing through the platen is acquired.

In accordance with another aspect of the exemplary embodiment, a scanning device includes a platen having a sheet side and a scanning device side, opposite the sheet side. An automatic document feeder feeds documents to a scanning position on the platen. A scan sensor is positioned on the scanning device side of the platen and a backing plate of a first color is spaced from the platen by an electrochromic layer which is transparent in a first state and opaque in a second state; A controller is electrically connected to the backing plate, the controller providing energy to the electrochromic layer for changing the state of electrochromic layer between the first and second states.

DETAILED DESCRIPTION

Aspects of the exemplary embodiment relate to a scanner device, to a backing assembly for a scanning device, and to a method of scanning.

Figure 1:
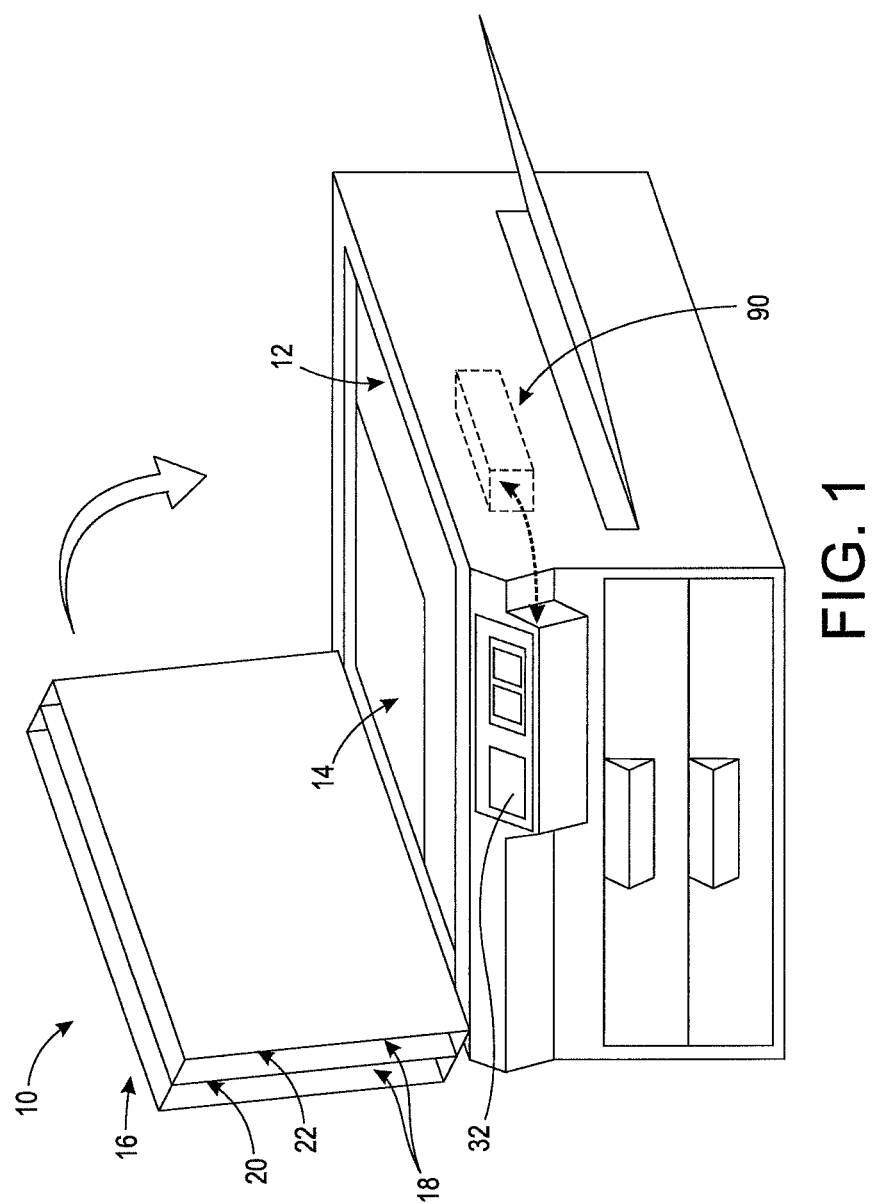
FIG. 1 illustrates a scanning device in accordance with one aspect of the exemplary embodiment.

With reference to FIG. 1, a scanning device 10 includes a transparent platen 12 on which an item 14 to be scanned, such as a sheet is positionable. A scanner cover 16 is used to cover the sheet during scanning. The scanner cover includes a backing assembly 18 which includes a backing plate 20 (e.g., white or black in color) and a backing layer 22, which is selectively changeable between opaque and transparent states, e.g., when a voltage is imposed on the layer. The backing layer is thus capable of changing the transmittance of visible light. The backing layer 22 may be referred to herein as an electrochromic layer as it changes color in response to an electric field/applied voltage. The electrochromic layer 22 may include a polymer dispersed liquid crystal (PDLC) glass or electrochemical glass. During scanning, the electrochromic layer 22 is interposed between the platen 12 and the backing plate 20 and is at least partially spaced from the platen 12 by a document 14 being scanned during scanning.

In one embodiment, original documents 14 are fed via a document handler from a first tray to a second tray following a paper path. The document handler may include one or more drive rollers, feeding the original in a process direction from the first tray to the second tray. The scanner may include a constant velocity transport (CVT) scanning station that has a CVT glass and CVT ramp. The CVT scanning station is positioned after the drive roller in the process direction. The optical sensor may remain stationary in the CVT scanning station during operation of the document handler. In some cases, a document may be placed directly on the scanner glass. When a document is placed directly on the scanner glass, the optical sensor is then moved past the document along the bottom surface of the scanner glass.

In the case of a single pass version of a document handler, a second fixed scanner may be provided inside the document handler. The second fixed scanner is positioned to scan the second side of an original document.

Figure 2:
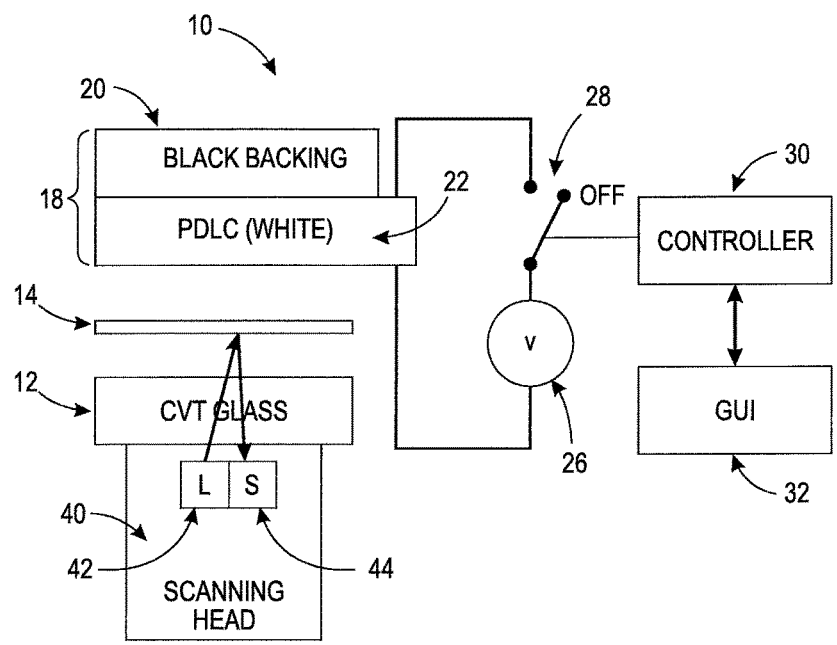
FIG. 2 is a schematic cross-sectional view of part of the scanning device of FIG. 1 with a backing layer in an opaque state in accordance with one aspect of the exemplary embodiment.
Figure 3:
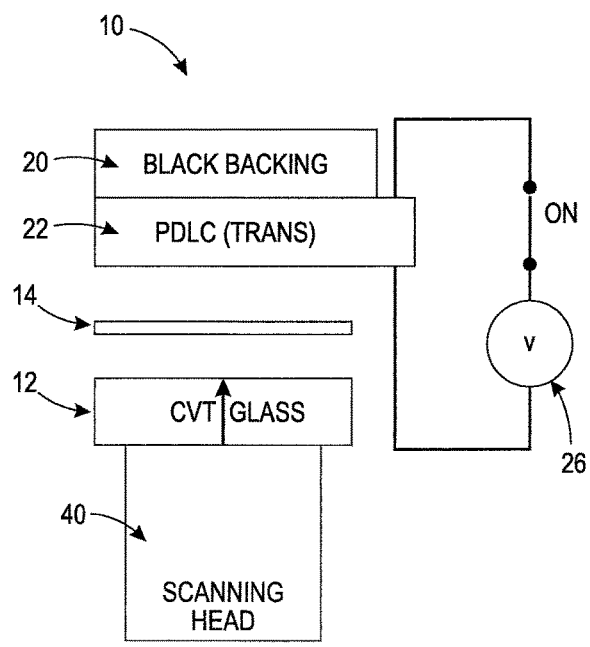
FIG. 3 is a schematic cross-sectional view of FIG. 2 with the backing layer in transparent state in accordance with another aspect of the exemplary embodiment.
Figure 4:
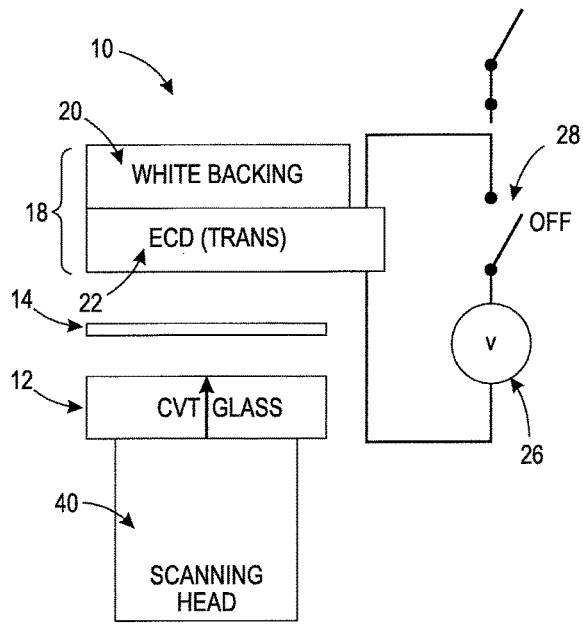
FIG. 4 is a schematic cross-sectional view of part of the scanning device of FIG. 1 with the backing layer in transparent state in accordance with another aspect of the exemplary embodiment.

With reference also to FIGS. 2-4, which schematically illustrate different embodiments of the backing assembly 18, the electrochromic layer 22 is positioned adjacent to the backing layer 20. An item 14 placed on or transported across the platen 12 is effectively sandwiched between the platen and the scanner cover 16. The platen may be formed from CVT glass or may be a multilayer construction, as described in U.S. Pat. No. 6,377,339.

Figure 5:
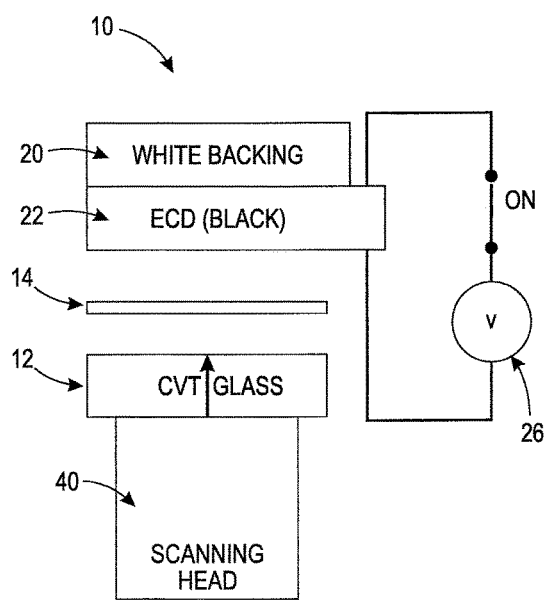
FIG. 5 is a schematic cross-sectional view of part of the scanning device of FIG. 4 with the backing layer in an opaque state in accordance with another aspect of the exemplary embodiment.

A voltage source 26 such as a DC power supply, is selectively connected with the electrochromic layer 22 by a switch 28 to create a circuit which includes the electrochromic layer. In its opaque state, the electrochromic layer 22 is of a different color to the backing plate 20. The electrochromic layer may be opaque in the powered state and transparent in the unpowered state, or vice versa. In the embodiment of FIGS. 2 and 3, the electrochromic layer is opaque (e.g., white) in the unpowered state (FIG. 2) and transparent in the powered state. In the embodiment of FIGS. 4 and 5, the electrochromic layer is opaque (e.g., black) in the powered state (FIG. 5) and transparent in the powered state (FIG. 4). As will be appreciated, rather than simply changing between black and white, black and white, other colors, e.g., different shades of grey, may be effected by the combination of the backing plate and electrochromic layer.

The voltage source 26/switch 28 may be under the control of a controller 30, such as a microprocessor device, for selectively applying a voltage across the electrochromic layer 22 to change the state of the electrochromic layer. A graphical user interface 32, e.g., located on the scanner housing, enables a user to interact with the controller 30 for selecting between an opaque and a transparent electrochromic layer, or alternatively, select between backing assembly colors (e.g., white, black and/or one or more shades of grey). In another embodiment, the scanner controller 30 automatically selects a suitable color of the backing assembly based on the document to be scanned. For example, the controller applies a test routine on the document 14 to be scanned and automatically selects an appropriate backing assembly color, based on one or more parameters, such as a detected level of show-through in two or more scans.

A scanning head 40 is positioned adjacent the platen 12 in a position to optically scan the items 14, such as a sheet of paper, positioned on the platen for scanning. The scanning head includes a light source (L) 42 for illuminating the document 14, and an optical sensor (S) 44, which detects light reflected from the document and generates an image therefrom. The optical sensor is generally positioned at a home position at one extreme end of the platen when not scanning and is moved on a carriage during scanning. The platen may be covered by a closable lid or cover (which can include a document handler or automatic document feeder (ADF) in some devices and which in the illustrative embodiment, incorporates the backing assembly 18. The image sensor 44 may incorporate photosensitive devices (e.g., photodiodes or other photosensitive devices) that measure the intensity of light reflected from given areas of the document. The sensor data is then translated from analog to digital, thereby defining the image elements (i.e., pixels) of the document being scanned. Combined, these pixels represent the document in electronic form.

In FIGS. 2 and 3, the backing plate 20 is a dark color, e.g., black, while the electrochromic layer 22 is a lighter color, e.g., white, in its opaque state. In this embodiment, the electrochromic layer 22 is opaque (colored) in its unpowered state and transparent in the powered state. In the embodiment of FIGS. 4 and 5, which may be similarly configured to FIGS. 2 and 3, except as noted, the backing plate 20 is a light color, e.g., white, while the electrochromic layer 22 is a darker color, e.g., black or dark grey, in its opaque state. In this embodiment, the electrochromic layer 22 is colored in its powered state and transparent in its unpowered state.

Figure 6:
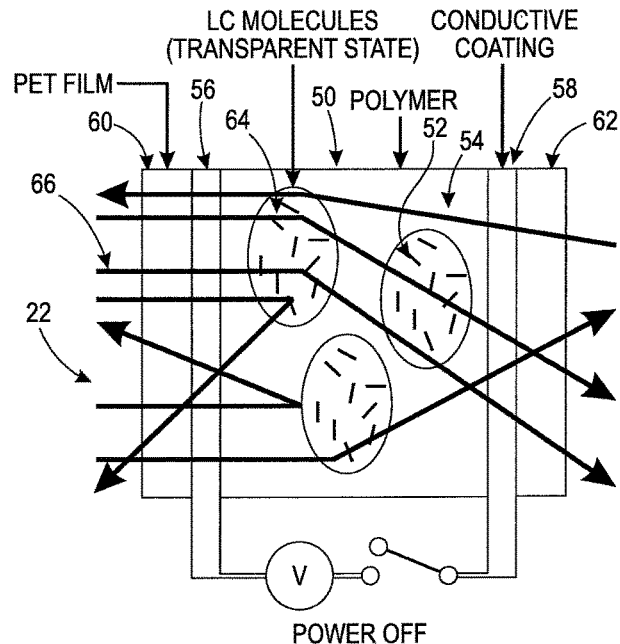
FIG. 6 is an enlarged schematic view of liquid crystals in a polymer dispersed liquid crystal (PDLC) backing layer of FIG. 2 in an inactive (unpowered) state.
Figure 7:
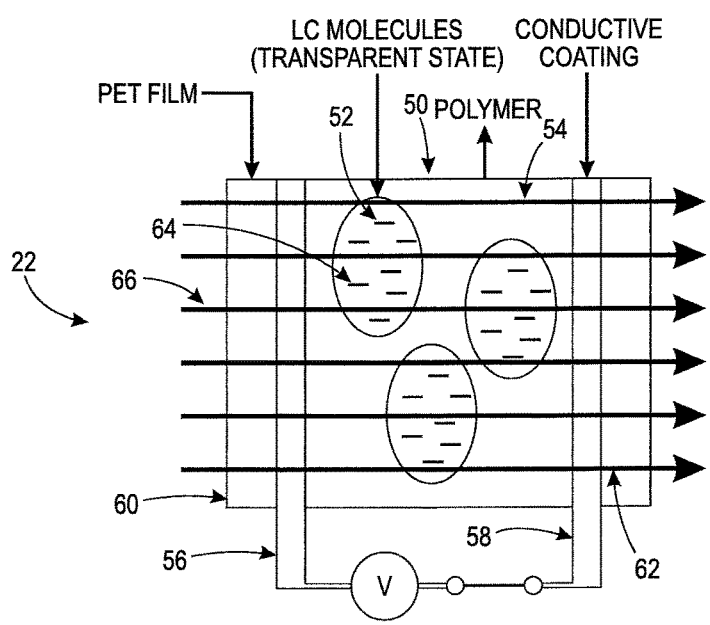
FIG. 7 is an enlarged schematic view of the liquid crystals in a polymer dispersed liquid crystal (PDLC) backing layer of FIG. 3 in an activated (powered) state.

As illustrated in FIGS. 6 and 7, the electrochromic layer of FIGS. 2 and 3 may be constructed using a polymer/liquid crystal filler. A polymer/liquid crystal filler contains liquid crystal material filling the voids in a solid (although possibly flexible) polymer matrix. Although several such fillers are suitable, they all share several common optical properties. As an example, layer 22 is a multi-layer construction which includes polymer-dispersed liquid crystals (PDLCs) in a middle layer 50. PDLCs contain liquid crystal droplets 52

(with sizes on the order of one to a few microns) dispersed in a solid polymer matrix 54. The layer 50 is sandwiched between conductive coating layers) 56 58, which, in turn may be protected by one or more transparent substrate layers 60, 62, e.g., PET film or glass, which define the exterior surfaces of the electrochromic layer.

Example electrochromic media which can be used in layer 50 are described in U.S. Pat. Nos. 5,691,795, 5,928,572, 6,061,107, 6,377,339, and U.S. Pub. No. 20160202191, the disclosures of which are hereby incorporated herein by reference in their entirety, and in Fergason, J. L. "Polymer encapsulated nematic liquid crystals for display and light control applications". SID Int. Symp. Dig. Technol. 16, 68-70 (1985) and U.S. Pat. No. 4,435,047 to Fergason, issued Mar. 6, 1984, entitled "Encapsulated liquid crystal and method"; J. W. Doane, et al., "Field controlled light scattering from nematic microdroplets," Appl. Phys. Lett., Vol. 48, 269 (1986); J. W. Doane, et al, "Polymer Dispersed Liquid Crystals for Display Applications," Mol. Cryst. Liq. Cryst. 165, 511 (1988); J. L. West, "Phase Separation of Liquid Crystals in Polymers," Mol. Cryst. Liq. Cryst. 157, 427 (1988); and T. Nagata, et al., "Silicon Chip Based Reflective PDLC Light Valve for Projection Display", SID Symposium Digest 29, 37 (1998).

The refractive index of the droplets 52 is anisotropic, i.e., the index parallel to the nematic directors 64 in the droplets is significantly different from the index perpendicular to the directors. The index of refraction for the polymer matrix 54 may be closely matched to the index of refraction for the liquid crystal droplets measured parallel to their directors. In a first state (FIG. 6), the directors 64 of the droplets take on random orientations, such that polymer/liquid crystal interfaces with a variety of indices of refraction are presented to an incoming light wave 66. Thus, in the first state, such as when not activated, the PDLC film scatters light, making the film appear opaque. In a second state (FIG. 7), such as when the PDLC film is placed under an electric field generated between the conductive coating layers 56, 58, however, the directors 64 tend to align with the field. The index of refraction for the aligned droplets matches the index for the polymer matrix, such that light 66 propagating parallel to the field may then pass through the field with little scattering, making the film appear transparent. In other words, when the power is OFF, as shown in FIG. 6, the liquid crystal droplets are arranged in an irregular manner, dispersing light and making the layer 22 opaque. When the power is ON, as shown in FIG. 7, the liquid crystal droplets are arranged in a regular manner, allowing light to pass uninterrupted and making the layer 22 transparent.

With reference also to FIG. 3, if the controller 30 is on and voltage is applied across the electrochromic layer 22, the layer becomes transparent thereby revealing the black backing 20 through the layer 22. That is, when electricity from an electrical power source 26, such as a low electric field, is applied to the PDLC film 50, the liquid crystals line up, changing the glass from opaque to clear. Conversely, when electricity from the electrical power source is removed, the liquid crystals return to their normal scattered positions changing the layer 22 back to opaque, as shown in FIG. 6. In the case of the electrochromic layer 22 of FIGS. 4 and 5, the layer is normally transparent and requires energizing to make it opaque.

The user may select the state/backing assemble color using the GUI 32. For example, the GUI may display a "select backing" mode in which the user can select between white and black backings, and/or in some cases, a range of shades of grey in between where the electrochromic layer is partly activated. The user may be presented, via the GUI, with the ability to select a test mode, in which the scanner scans a document page in both white and black states. The user may manually review the results and select the best state for scanning the entire document. Or, the controller 30 may automatically select from the possible states. For example, the controller may include memory which stores software instructions for determining show through, by comparing scans in both states. The instructions are implemented by a processor. If the scans are substantially the same, i.e., no show through in an image in the white state and/or other image defects, the controller may use the white state of the assembly 18 for scanning the document, otherwise, the black (or grey) state may be used. The assembly 18 may be maintained in its most commonly used state as a default state if the user chooses not to select a state.

In some embodiments, the optical sensor 44 may provide feedback for the color of the assembly 18 behind the white target 14, so that as the layer 22 becomes more transparent, a central processing unit (CPU) of the scanning device may decrease the gain, thereby controlling the amount of white reflected.

Figure 8:
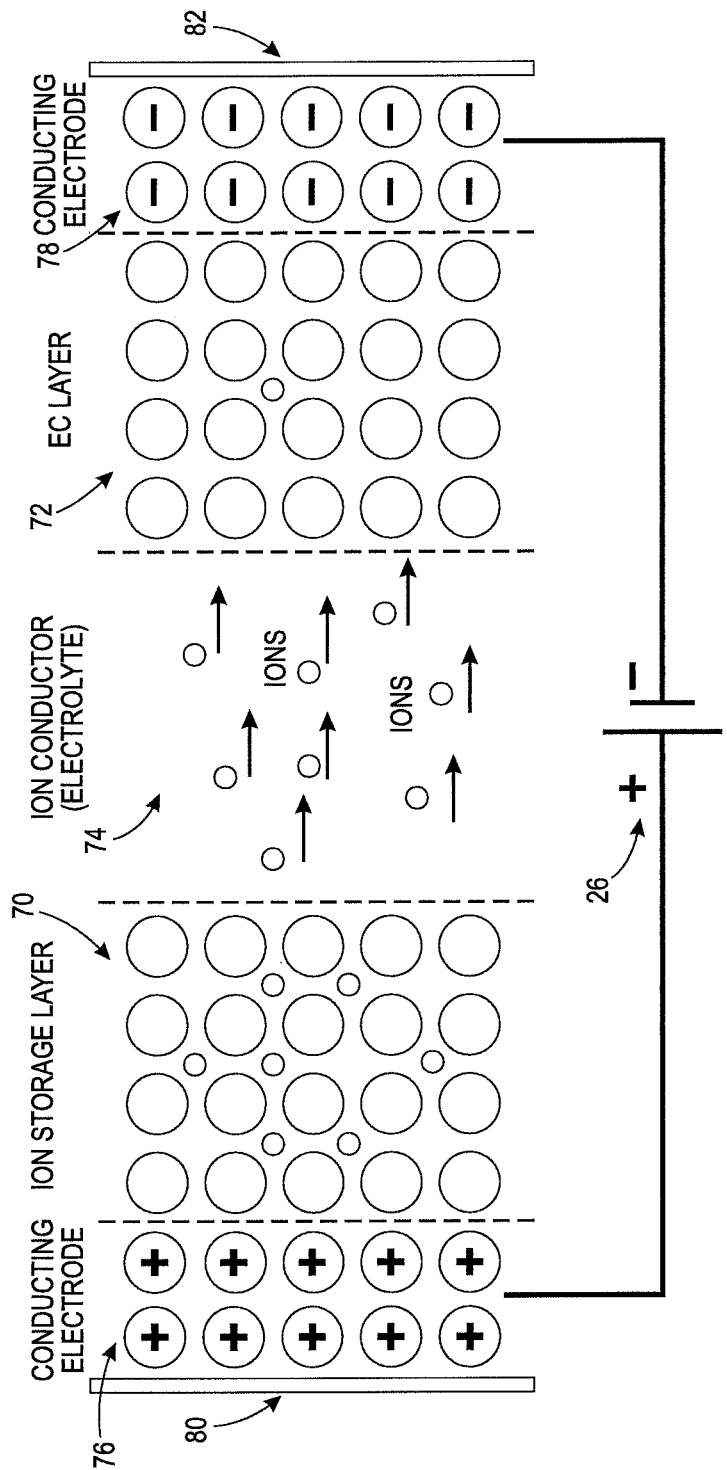
FIG. 8 is a schematic view of the arrangement of ions in the electrochromic backing layer of FIG. 4.

In the embodiment of FIGS. 4 and 5, an electrochromic device (ECD) or electrochromic glass is utilized as layer 22. The basic structure of the ECD is shown in FIG. 8. The ECD includes two electrochromic layers 70, 72 (an ion storage layer 70 and an electrochromic layer 72) separated by an electrolytic layer 74. Conducting electrodes 76, 78 are situated on the outer side of the electrochromic layers 70, 72. The layer 22 may include five superimposed layers 76, 70, 74, 72, 78 on one substrate 80 or 82 or positioned between two substrates 80, 82 in a laminated configuration, which may be formed of glass or other optically transparent material, as for the embodiment of FIGS. 2 and 3. External voltage is applied through the electrodes 76, 78 to the electrochromic layers to activate ionic activity.

Optical absorption occurs when electrons move into the electrochromic layers from the transparent conductors 76, 78 along with charge balancing ions entering from the electrolytic layer 74. The electrochromism occurs due to the electrochemical redox reactions that take place in such an event. In the unpowered state, the layer 22 remains transparent, exposing a white background positioned behind the layer. However, in the powered state, the electrochromic layer becomes black, thereby obscuring the white backing.

Examples of electrochromic glass are described, for example, in U.S. Pat. Nos. 5,171,413, 8,730,552, and 8,824,038, and U.S. Pub. No. 20090323158, the disclosures of which are incorporated herein by reference.

In some embodiments, the optical sensor 44 may provide feedback for the color of the backer against the white target, so that as the backer becomes darker, the central processing unit (CPU) may increase the gain, thereby controlling the amount of grey color reflected.

Figure 9:
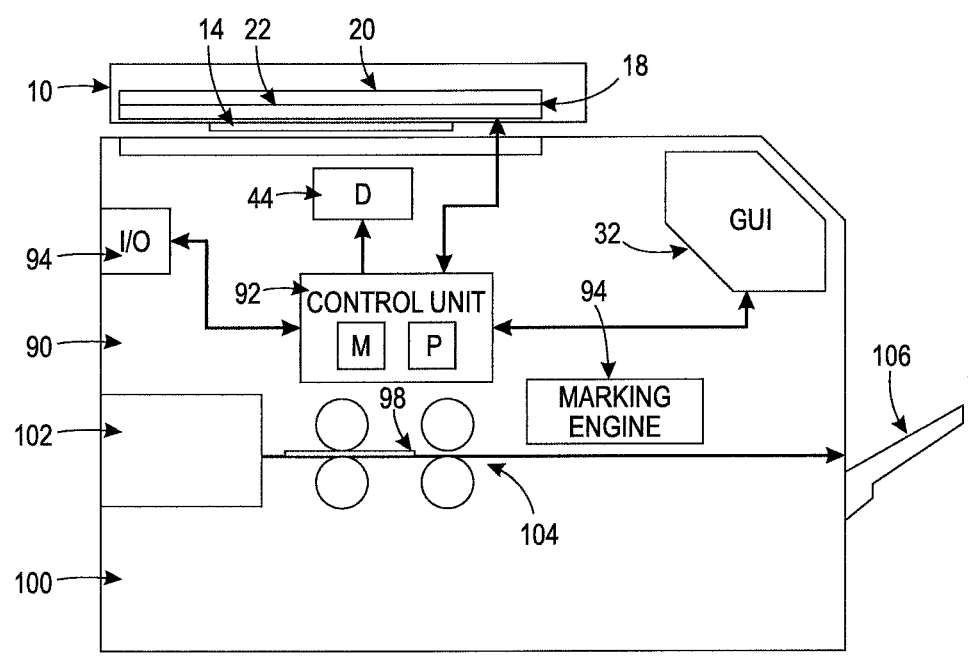
FIG. 9 is a functional block diagram of a multifunctional device incorporating the scanning device of FIG. 1.

The scanning device may form a part of a multi-function device (MFD), which can be used with devices and methods herein. The multi-function device (MFD) can include, for example, a printer, copier, fax machine, or combination thereof. As illustrated in FIG. 9, the MFD 90 may include a central processing unit (CPU) 92 and at least one marking device 94 (print engine(s)) operatively connected to the control unit 92. The MFD may also include a communications port (Input/Output device) 96 operatively connected to the control unit 92 and to a computerized network external to the MFD. The Input/Output device may be used for communications to and from the MFD.

Further, the marking device 94 is any device capable of rendering an image on a flexible medium 98, such as paper with a marking medium, such as ink or toner. To render an image, the image data (or a signal thereof) acquired by the scanner device is reduced to viewable form; store the image data to memory or a storage device for subsequent retrieval; or communicate the image data to another device. Such communication may take the form of transmitting a digital signal of the image data over a network.

The control unit 92 controls the various actions of the MFD, and may include a non-transitory memory device (M) (which can be optical, magnetic, capacitor based, etc.) which stores instructions for operating the MFD, including the selection of the backing assembly color. The memory is readable by a processor device (P) and stores instructions that the processor P executes to allow the MFD to perform its various functions, such as those described herein.

The control unit 92 may include application specific integrated circuits (ASICs) that are specialized for the handling of image processing operations, processing image data, calculating pixel values, etc. In one example, the MFD is special purpose machine that includes a specialized image processing card having unique ASICs for providing clear image processing, includes specialized boards having unique ASICs for input and output devices to speed network communications processing, a specialized ASIC processor that performs the logic of the methods described herein using dedicated unique hardware logic circuits, etc. It is contemplated that the control unit 92 may comprise a raster image processor (RIP). A raster image processer uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

The MFD body housing 100 has one or more functional components that operate on power supplied from an external power source, which may comprise an alternating current (AC) power source, through the power supply. The power supply can comprise a power storage element (e.g., a battery) and connects to the external power source. The power supply converts the power from the external power source into the type of power needed by the various components of the MFD.

The multi-function device herein may include a media supply 102 supplying media 98 to a media path 104. The media path can comprise any combination of belts, rollers, nips, drive wheels, vacuum devices, air devices, etc. A print engine is positioned along the media path. That is, the multi-function device comprises a document-processing device having the print engine. The print engine prints marks on the media. After receiving various markings from the print engine(s), the sheets of media can optionally pass to a finisher which can fold, staple, sort, etc., the various printed sheets. A return paper path may deliver the printed sheets to the same or different print engine for at least a second layer of marking medium, e.g., toner to be applied. Each return of the media to the print engine is referred to herein as a "pass." The printed media is output to an output tray 106.

As would be understood by those ordinarily skilled in the art, the multi-function device described above is only one example and the systems and methods herein are equally applicable to other types of devices that may include fewer components or more components. For example, while a limited number of print engines and media paths are disclosed, those ordinarily skilled in the art would understand that many more paper paths and additional print engines could be included within any device used with embodiments herein.

An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

Printing devices, such as disclosed above, are typically full featured. Various ones of the features provide one or more functions to be performed on a job. For example, a job may include capturing an image at the image input section for storage. The image may undergo a significant amount of image processing allowing for the minimization of image related artifacts and various electronic pages may be edited after the job has been suitably stored. After outputting of the stored job, a host of finishing operations, such as stapling, folding, and trimming may be performed on the hardcopy version of the job to optimize its appearance.

As would be understood by those ordinarily skilled in the art, the MFD described is only one example, and the devices and methods herein are equally applicable to other types of printing devices that may include fewer components or more components. For example, while a limited number of printing engines and paper paths are disclosed, those ordinarily skilled in the art would understand that many more paper paths and additional printing engines could be included within any printing device used with devices and methods herein. As will be appreciated, the scanning device 10 need not be a part of a MFD and may simply be image scanner.

An exemplary imaging system comprises a multifunctional device with print, copy, scan, and fax services. Such multifunctional devices are well known in the art and may comprise print engines based upon liquid or solid ink jet, electrophotography, other electrostatographic technologies, and other imaging technologies. The general principles of imaging are well known to many skilled in the art and are described above as an example of an imaging system to which the present concepts is applicable.

It should be understood that the control unit 92 as used herein comprises a computerized device adapted to perform (i.e., programmed to perform, configured to perform, etc.) the below described system operations. According to devices and methods herein, the control unit 92 comprises a programmable, self-contained, dedicated mini-computer having a central processor unit (CPU). Computerized devices that include chip-based central processing units (CPU's) are well-known and readily available devices produced by manufacturers such as Dell Computers, Round Rock Tex., USA, and Apple Computer Co., Cupertino Calif., USA. Such computerized devices commonly include input/output devices, power supplies, processors, electronic storage memories, wiring, etc. While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, it is not intended for the claims presented below to be limited by the attached drawings, but instead the attached drawings are merely provided to illustrate a few ways in which the claimed features can be implemented.

Figure 10:
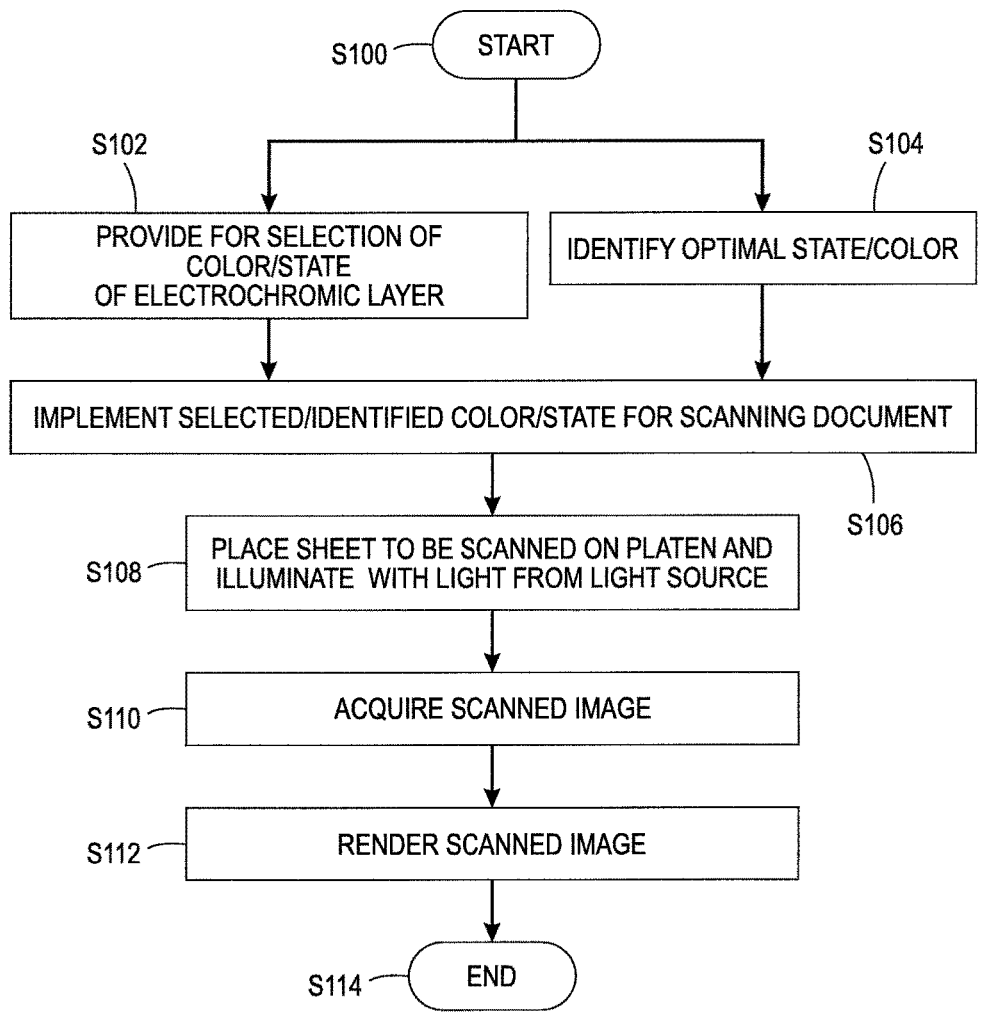
FIG. 10 illustrates a method of scanning with the exemplary scanning device.

FIG. 10 illustrates a method of scanning with the exemplary scanning device of any one or more of FIGS. 1-8. The method begins at S100. At S102, provision is made for a user to select a color/state of the backing assembly. Alternatively, at S104, a color/state of the backing assembly is automatically selected. At S106, the controller/control unit implements the selection by closing/opening the switch to apply/not apply a voltage to layer 22. At S108 a sheet to be scanned is placed on the platen of the scanning device and moved relative to the light source. At S110, an image of the sheet is acquired by the sensor. At S112 the image is rendered, e.g., on print media or output as a digital image. The method ends at S114.

The term 'printer,' 'printing device,' 'reproduction apparatus,' or 'imaging apparatus' as used herein broadly encompasses any apparatus, such as various printers, copiers, or multifunction machines or systems and may include a digital copier, bookmaking machine, facsimile machine, multifunction machine, etc., which performs a print outputting function, such as xerographic, lithographic, inkjet, or otherwise, for any purpose, unless otherwise defined in a claim. The term 'sheet' or 'substrate' herein refers to any physical sheet of paper, plastic, or other useable physical substrate for printing images thereon, whether precut or initially web fed. The details of printers, printing engines, etc., are well known by those ordinarily skilled in the art and are not described in detail herein to keep this disclosure focused on the salient features presented. The devices and methods herein can encompass devices that print in color, monochrome, or handle color or monochrome image data. All foregoing devices and methods are specifically applicable to electrostatographic and/or xerographic machines and/or processes.

The terminology used herein is for the purpose of describing particular devices and methods only and is not intended to be limiting of this disclosure. As used herein, the singular forms "a," "an," and "the," are intended to include the plural forms as well, unless the context clearly indicates otherwise. It will be further understood that the terms "comprises", "comprising", and/or "including", when used in this specification, specify the presence of stated features, integers, steps, operations, elements, and/or components, but do not preclude the presence or addition of one or more other features, integers, steps, operations, elements, components, and/or groups thereof.

In addition, terms such as "right," "left," "vertical," "horizontal," "top," "bottom," "upper," "lower," "under," "below," "underlying," "over," "overlying," "parallel," "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms "automated" or "automatically" mean that once a process is started (by a machine or a user), one or more machines perform the process without further input from any user.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A scanning device, comprising:
a transparent platen which receives a sheet to be scanned;
a backing assembly which is spaced from the platen by the sheet during scanning, the backing assembly including a backing plate of a fixed color and an electrochromic layer, intermediate the backing plate and the platen, the backing assembly having a plurality of states selected from:
  a first state, in which the electrochromic layer is opaque and has a different color from the fixed color,
  a second state, in which the electrochromic layer is transparent to expose the backing plate therethrough, and
  a plurality of third states in which the electrochromic layer is only partially-activated, each of the third states effecting a different grey color of the backing assembly,
  each of the plurality of states effecting a different color of the backing assembly;
a sensor positioned to acquire an image of the sheet based on light passing through the platen; and
a controller which selectively applies a voltage across the electrochromic layer to change the electrochromic layer between the first and second states, the controller having a test mode and a scanning mode, wherein in the test mode, the controller causes the scanner to scan the sheet using different colors of the backing assembly, the controller automatically selecting one of the different colors of the backing assembly to be used thereafter during scanning of the sheet, wherein in the scanning mode, the scanning device acquires the image of the sheet with the sensor, using the automatically-selected one of the different colors of the backing assembly.

2. The scanning device according to claim 1, wherein the electrochromic layer comprises one of a polymer dispersed liquid crystal and an electrochromic device.

3. The scanning device according to claim 1, wherein the backing plate is a dark color and wherein the electrochromic layer has a lighter color in the first state which masks the dark color of the backing plate.

4. The scanning device according to claim 1, wherein the backing plate is a light color and wherein the electrochromic layer has a darker color in the first state which masks the dark color of the backing plate.

5. The scanning device according to claim 1, further comprising a light source which illuminates the sheet through the platen.

6. The scanning device of claim 1, further comprising a voltage source which applies the voltage across the electrochromic layer in one of the first and second states.

7. The scanning device of claim 1, wherein the backing plate is white and the electrochromic layer is black in the first state.

8. The scanning device of claim 1, wherein the backing plate is black and the electrochromic layer is white in the first state.

9. The scanning device of claim 1, further comprising:
an automatic document feeder which feeds documents to a scanning position on the platen.

10. A scanning device, comprising:
a transparent platen which receives a sheet to be scanned;
a backing assembly which is spaced from the platen by the sheet during scanning, the backing assembly including a backing plate of a fixed color and an electrochromic layer, intermediate the backing plate and the platen, the backing assembly having a plurality of states including:
  a first state, in which the electrochromic layer is opaque and has a different color from the fixed color,
  a second state, in which the electrochromic layer is transparent to expose the backing plate therethrough, and
  a plurality of third states in which the electrochromic layer is only partially-activated, each of the third states effecting a different grey color of the backing assembly,
  each of the plurality of states effecting a different color of the backing assembly;
a user interface which enables a user to select a state of the electrochromic layer from the plurality of states or one of the different colors of the backing assembly;
a sensor positioned to acquire an image of the sheet based on light passing through the platen; and
a controller which selectively applies a voltage across the electrochromic layer to change the electrochromic layer between the first and second states, whereby in a scanning mode, the scanning device acquires the image of the sheet with the sensor, using the user-selected state of the electrochromic layer or the one of the different colors of the backing assembly.

11. The scanning device according to claim 10, wherein the controller adjusts a voltage applied to the electrochromic layer based on the user input.

12. A scanning method, comprising:
  receiving a sheet to be scanned on a transparent platen;
  providing a backing assembly which is spaced from the platen by the sheet during scanning, the backing assembly including a backing plate of a fixed color and an electrochromic layer intermediate the backing plate and the platen which has a plurality of states, each of the plurality of states effecting a different color of the backing assembly, the plurality of states including: a first state in which the electrochromic layer is opaque and has a first color, a second state, in which the electrochromic layer is transparent to expose the backing plate therethrough, and a plurality of third states, each of the third states effecting a different grey color of the backing assembly;
  in a test mode, scanning the sheet using different colors of the backing assembly to generate test scans by selectively applying different voltages across the electrochromic layer to change the electrochromic layer between the first and second states;
  thereafter, comparing the test scans generated in the first and second states and, based on the comparison, selecting one of the plurality of states or different colors of the backing assembly to be used during scanning of the sheet; and
  in a scanning mode, acquiring an image of the sheet based on light passing through the platen using the selected one of the plurality of states or different colors of the backing assembly.

13. The method according to claim 12, wherein the electrochromic layer comprises one of a polymer dispersed liquid crystal and an electrochromic device.

14. The method according to claim 12, further comprising receiving the selection of one of the plurality of states or one of the different colors of the backing assembly from a user interface.

15. The method according to claim 12, further comprising adjusting a voltage applied to the electrochromic layer based on the user selection.

16. The method according to claim 12, wherein the acquiring of the image comprises illuminating the sheet through the platen.

* * * * *